United States Patent
Miyashita

(10) Patent No.: US 11,890,842 B2
(45) Date of Patent: Feb. 6, 2024

(54) OVERLAPPED COMPOSITE COMPONENT AND METHOD FOR MANUFACTURING OVERLAPPED COMPOSITE COMPONENT

(71) Applicant: TOYODA IRON WORKS CO., LTD., Toyota (JP)

(72) Inventor: Osamu Miyashita, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 361 days.

(21) Appl. No.: 17/059,216

(22) PCT Filed: Apr. 24, 2019

(86) PCT No.: PCT/JP2019/017386
§ 371 (c)(1),
(2) Date: Nov. 26, 2020

(87) PCT Pub. No.: WO2019/235094
PCT Pub. Date: Dec. 12, 2019

(65) Prior Publication Data
US 2021/0197522 A1    Jul. 1, 2021

(30) Foreign Application Priority Data

Jun. 4, 2018    (JP) ................. 2018-106994

(51) Int. Cl.
| | | |
|---|---|---|
| B32B 7/09 | (2019.01) | |
| B32B 7/022 | (2019.01) | |
| B32B 3/30 | (2006.01) | |
| B32B 27/30 | (2006.01) | |
| B32B 3/02 | (2006.01) | |

(52) U.S. Cl.
CPC .............. *B32B 27/304* (2013.01); *B32B 3/02* (2013.01); *B32B 3/30* (2013.01); *B32B 7/022* (2019.01); *B32B 27/302* (2013.01); *B32B 2250/02* (2013.01); *B32B 2250/24* (2013.01); *B32B 2307/51* (2013.01)

(58) Field of Classification Search
CPC .................................. B32B 7/09; B32B 3/30
See application file for complete search history.

(56) References Cited

U.S. PATENT DOCUMENTS 8,678,458 B2 * 3/2014 Filipp ................. B29C 44/5627
428/102
2017/0334371 A1 * 11/2017 Miyashita ................. B32B 3/30

FOREIGN PATENT DOCUMENTS

| JP | S63-199641 A | 8/1988 |
| JP | 2016-117470 A | 6/2016 |

* cited by examiner

*Primary Examiner* — David Sample
*Assistant Examiner* — Donald M Flores, Jr.

(57) ABSTRACT

A layered composite component includes a plate-shaped base member formed from a plastic material, a cover member layered on the base member, and a stitching. The cover member includes a plate-shaped main body extending along the base member such that the main body is spaced apart by a gap from the base member and projections projecting from an opposing surface of the main body opposed to the base member. The cover member is formed from a plastic material and is elastically deformable. The cover member includes a stitched portion linearly extending and including a portion on which the stitching is formed. The projections are not formed on the stitched portion, and the stitched portion includes a ridge extending along the stitching.

9 Claims, 6 Drawing Sheets

OVERLAPPED COMPOSITE COMPONENT AND METHOD FOR MANUFACTURING OVERLAPPED COMPOSITE COMPONENT

TECHNICAL FIELD

The present disclosure relates to a layered composite component and a method for manufacturing the layered composite component.

BACKGROUND ART

A layered composite component may have a structure in which synthetic resin plate members are layered with one another in a thickness-wise direction of the plates. Use of the layered composite component as a vehicle interior component such as a door trim, a luggage side trim, or an instrument panel has been proposed. For example, refer to Patent Document 1.

Patent document 1 describes a layered composite component including a plate-shaped base member and a plate-shaped cover member layered with the base member. Very small projections are arranged on a surface (opposing surface) of the cover member opposed to the base member. The projections project toward a surface (opposing surface) of the base member opposed to the cover member such that the opposing surface of the cover member is spaced apart from the opposing surface of the base member. In such a layered composite component, when the surface of the cover member is pushed toward the base member with a finger or hand, the projections come into contact with the opposing surface of the base member and are bent and deformed. The deformation produces a moderate reaction force so that the finger or hand receives a superior tactile sensation when pushing the surface of the cover member.

It has been also proposed that seams, or stitching, are put in a vehicle interior component through a sewing process to improve the ornamentality. For example, refer to Patent Document 2.

PRIOR ART DOCUMENTS

Patent Documents

Patent Document 1: Japanese Laid-Open Patent Publication No. 2016-117470
Patent Document 2: Japanese Laid-Open Patent Publication No. 63-199641

SUMMARY OF THE INVENTION

Problems that the Invention is to Solve

Stitching may be put in the above-described layered composite component to improve the ornamentality. In this case, a sewing apparatus such as a sewing machine performs a sewing process on the cover member of the layered composite component. In the layered composite component, the very small projections are arranged on the rear surface of the cover member. When the sewing process is simply performed on the cover member, the very small projections on the rear surface interfere and hinder the sewing process.

If the very small projections are not arranged on the section of the cover member where stitching is put and its peripheral section (stitch arranged section), the sewing process would be readily performed on the cover member. However, in this case, the tactile sensation varies between the stitch arranged section and the other section of the layered composite component.

It is an object of the present disclosure to provide a layered composite component that limits variations in a tactile sensation between a stitch arranged section and other sections and a method for manufacturing the layered composite component.

Means for Solving the Problems

To achieve the above object, an aspect provides a layered composite component. The layered composite component includes a plate-shaped base member formed from a plastic material, a cover member layered on the base member, and a stitching. The cover member includes a plate-shaped main body and projections. The main body extends along the base member such that the main body is spaced apart by a gap from the base member. The projections project from an opposing surface of the main body opposed to the base member. The cover member is formed from a plastic material and is elastically deformable. The stitching is formed by a sewing thread on the main body. The cover member includes a stitched portion linearly extending and including a portion of the opposing surface on which the stitching is formed. The projections are not formed on the stitched portion. The stitched portion includes a ridge extending along the stitching.

To achieve the above object, another aspect provides a method for manufacturing a layered composite component. The layered composite component includes a plate-shaped base member formed from a plastic material, a cover member layered with the base member, and a stitching. The cover member includes a plate-shaped main body and projections. The main body extends along the base member such that the main body is spaced apart by a gap from the base member. The projections project from an opposing surface of the main body opposed to the base member. The cover member is formed from a plastic material and is elastically deformable. The stitching is formed by a sewing thread on the main body. The cover member includes a stitched portion linearly extending and including a portion of the opposing surface on which the stitching is formed. The projections are not formed on the stitched portion. The stitched portion includes a ridge extending along the stitching. The method includes, as a sewing apparatus configured to form the stitching, using a sewing apparatus including two rising plates extending from an edge of a needle plate defining a needle hole so that the two rising plates extend parallel in a direction in which a sewing subject is fed. The method further includes, when the ridge is fitted to a gap between distal ends of the two rising plates, forming the stitching with the sewing apparatus sewing the stitched portion while feeding the cover member in one direction.

MODES FOR CARRYING OUT THE INVENTION

An embodiment of a layered composite component and a method for manufacturing a layered composite component will be described below.

Figure 2:
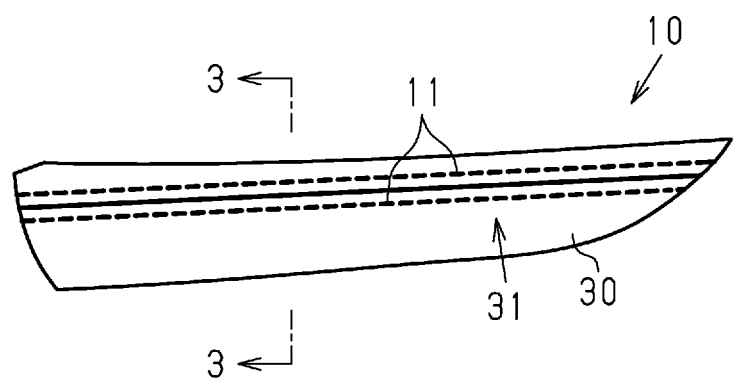
FIG. 2 is a side view of the interior component.
Figure 3:
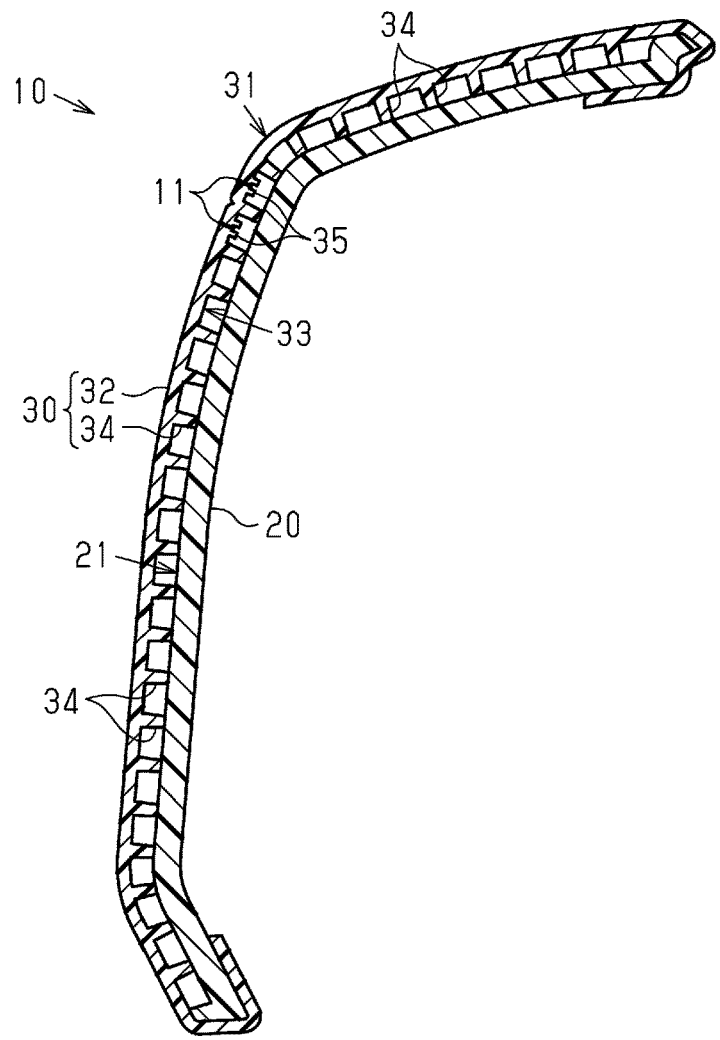
FIG. 3 is a cross-sectional view taken along line 3-3 in FIG. 2.

As shown in FIGS. 2 and 3, a layered composite component (hereafter, referred to as interior component 10) is configured to be a door trim corresponding to a vehicle interior component. The interior component 10 includes a plate-shaped base member 20 arranged at a vehicle outer side, that is, the right side in FIG. 3, and a cover member 30 layered with the base member 20 from a vehicle compartment inner side, that is, the left side in FIG. 3. In the interior component 10, a portion of the base member 20 located at the vehicle compartment outer side, that is, the right side in FIG. 3, is fixed to a vehicle door. The interior component 10 is arranged so that the cover member 30 is exposed to the vehicle compartment inner side. That is, a surface of the cover member 30 located at the vehicle compartment inner side, that is, the left side in FIG. 3, defines an ornamental surface 31.

The base member 20 is formed from a synthetic resin, for example, an acrylonitrile butadiene styrene (ABS) plastic. The base member 20 has the shape of a curved plate bulged toward the vehicle compartment inner side.

The entire cover member 30 is formed from a softer synthetic resin than the base member 20, for example, soft polyvinyl chloride, to be elastically deformable.

The cover member 30 includes a plate-shaped main body 32 extending along the base member 20. The main body 32 is curved and bulged toward the vehicle compartment inner side. The main body 32 is arranged so that a surface (opposing surface 33) of the main body 32 opposed to the base member 20 is spaced apart from a surface (opposing surface 21) of the base member 20 opposed to the main body 32 by a substantially constant gap at each position.

Figure 1:
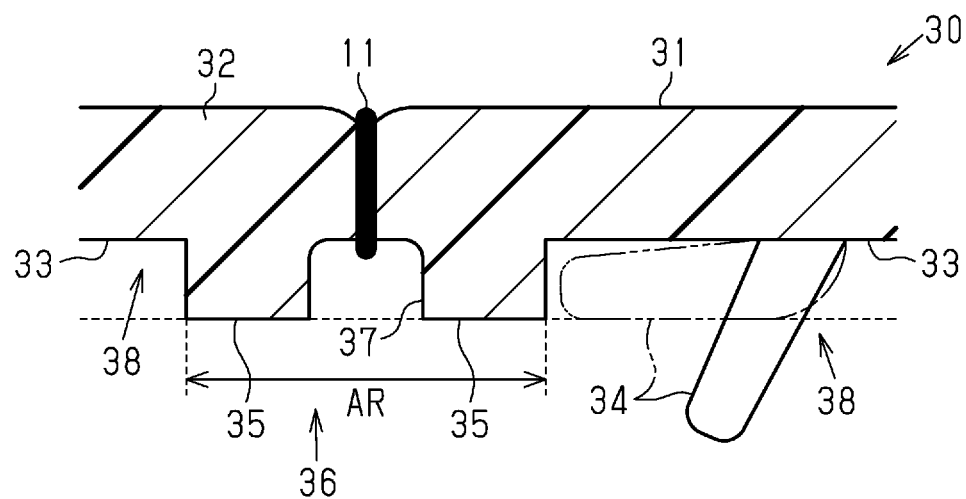
FIG. 1 is a cross-sectional view of ridges and their surroundings in an interior component as an embodiment of a layered composite component.

As shown in FIGS. 1 to 3, two lines of stitches (stitchings 11) are formed on the main body 32 of the cover member 30 by a sewing thread. The stitchings 11 have a shape of stitches that appear as a result of a straight sewing. The stitchings 11 extend parallel to each other in a longitudinal direction of the cover member 30, that is, a sideward direction in FIG. 2. The stitchings 11 are formed on the cover member 30, more specifically, the ornamental surface 31 of the cover member 30, to improve the ornamentality of the interior component 10.

Figure 4:
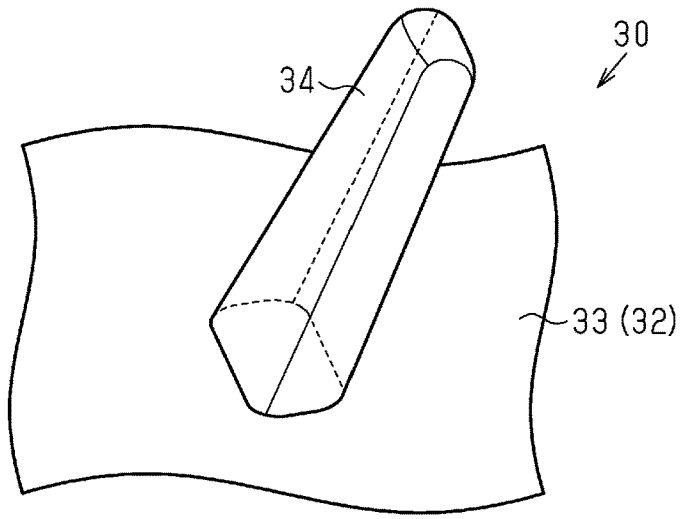
FIG. 4 is a perspective view of a projection arranged in the interior component.

As shown in FIGS. 3 and 4, the cover member 30 includes projections 34 projecting from the opposing surface 33 of the main body 32 toward the opposing surface 21 of the base member 20. The projections 34 are arranged integrally with the main body 32. The projections 34 are separately arranged in a range that occupies most of the opposing surface 33 of the main body 32.

As shown in FIG. 4, each projection 34 is shaped as a truncated rectangular pyramid and projects diagonally upward from the opposing surface 33 of the main body 32. That is, each projection 34 extends in a manner inclined at a predetermined inclination angle with respect to a perpendicular direction of the opposing surface 33. All of the corners of the projection 34 are rounded.

As shown in FIG. 3, when the cover member 30 extends over edges of the base member 20, that is, an upper end and a lower end of the base member 20 shown in FIG. 3, from the vehicle compartment inner side to the vehicle compartment outer side, the cover member 30 is fixed to the base member 20. Thus, in the interior component 10, when the distance between the opposing surface 21 of the base member 20 and the opposing surface 33 of the main body 32 is decreased, the projections 34 receive a load when contacting the opposing surface 21 of the base member 20. In this case, the projections 34 elastically deform and bend in a direction in which the inclination angle increases. A reaction force generated in accordance with such elastic deformation of the projections 34 provides the interior component 10 with a cushioning property.

In the present embodiment, the interior component 10 includes ridges 35 extending along the stitchings 11 in addition to the projections 34 arranged on the opposing surface 33 of the main body 32 so that a desired tactile sensation is obtained from each position of the ornamental surface 31 of the cover member 30. A specific layout of the projections 34 and the ridges 35 will be described below.

Figure 5:
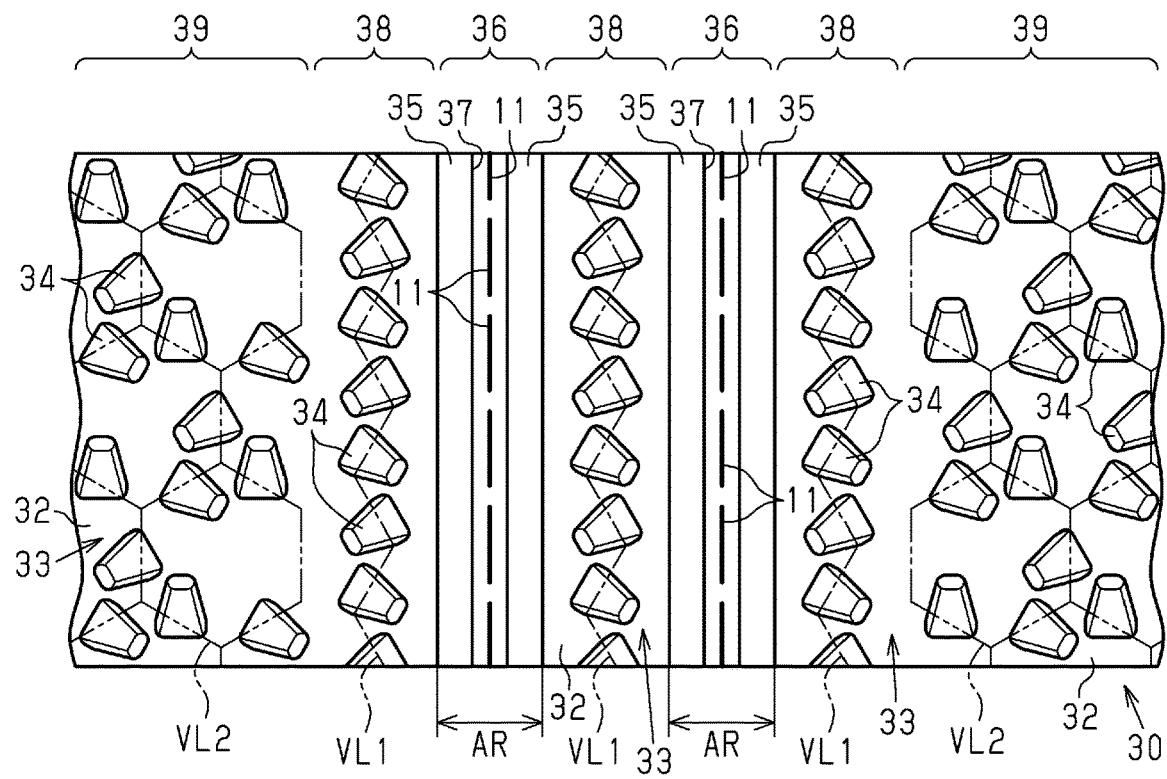
FIG. 5 is a side view showing an opposing surface of a cover member.

As shown in FIGS. 1 and 5, the opposing surface 33 of the main body 32 includes stitched portions 36, that is, portions linearly extending with a predetermined width AR and including portions on which the stitchings 11 are formed. The projections 34 are not formed on the stitched portions 36. In other words, the projections 34 are formed on only the portions of the opposing surface 33 of the main body 32 excluding the stitched portions 36. The ridges 35 extending along the stitchings 11 are arranged on the stitched portions 36. The ridges 35 extend having a rectangular cross section. A groove 37 extends in a center of the ridges 35 in a widthwise direction, that is, a sideward direction in FIG. 5. The stitching 11 is sewed on the bottom of the groove 37. In the present embodiment, a projection amount of a portion of the ridge 35 on which the stitching 11 is formed, more specifically, a projection amount of the bottom of the groove 37, is less than a projection amount of portions of the ridge 35 located at opposite sides of the portion on which the stitching 11 is formed. In the cover member 30, the ridges 35 are arranged for each of the two lines of the stitchings 11.

In FIG. 1, the double-dashed line shows a state of the projection 34 in which the elastic deformation amount is maximal in an assumed range when the ornamental surface 31 of the cover member 30 is pushed by a hand or finger. That is, the projection 34 is in a bottom touching state. As shown in FIG. 1, in the present embodiment, the projection amount of the ridges 35 from the opposing surface 33 of the main body 32 is set to be substantially equal to the projection amount of the projection 34 in the bottom touching state in the thickness-wise direction.

Figure 6:
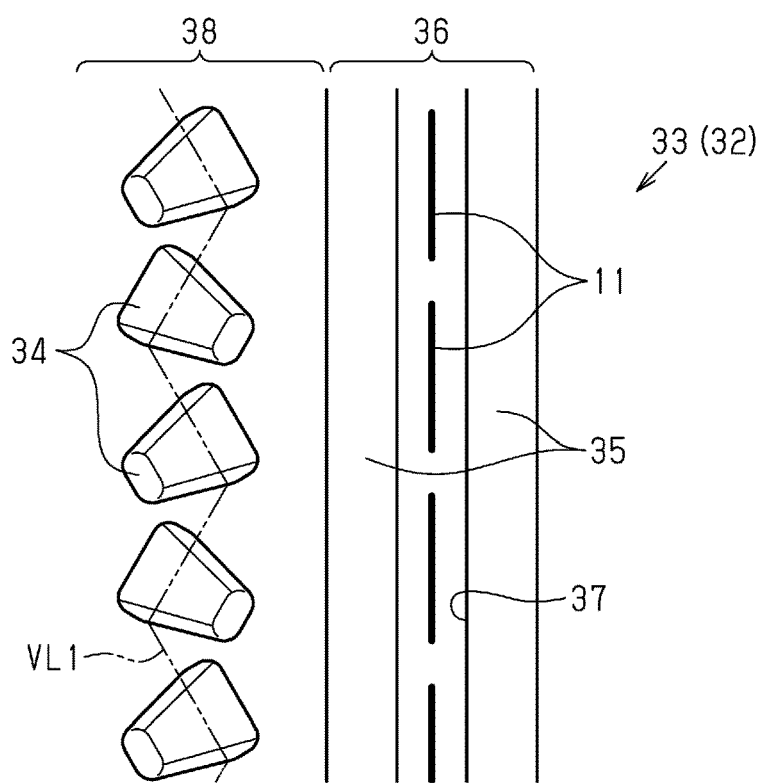
FIG. 6 is a side view showing a layout of projections on an adjacent section of an opposing surface of a cover member.

As shown in FIGS. 5 and 6, when an imaginary line VL1 extends on the opposing surface 33 of the main body 32 along the ridges 35, the projections 34 are arranged next to one another on the imaginary line VL1 in a section adjacent to the stitched portion 36 (the ridges 35), that is, an adjacent section 38. The imaginary line VL1 is triangle-wave-shaped and has portions bent at 120 degrees. In other words, the imaginary line VL1 extends in a zigzag. One projection 34 projects from each straight part of the imaginary line VL1.

Each projection 34 is slightly inclined in a direction orthogonal to the straight part of the imaginary line VL1 with respect to the perpendicular direction of the opposing surface 33. Also, each projection 34 is slightly inclined in direction opposite to a direction in which a sewing apparatus 40 feeds the cover member 30 when forming the stitchings 11, that is, an upper direction in FIG. 5, with respect to the perpendicular direction of the opposing surface 33. The projections 34 are arranged in the adjacent section 38 so that when the pushing of the ornamental surface 31 of the cover member 30 with a hand or finger elastically deforms the projections 34, the projections 34 will not contact other projections 34 and the ridges 35. In the present embodiment, the adjacent section 38 is defined in three sections, that is, sections located at opposite sides of the two stitched portions 36 and a section located between the two stitched portions 36. The sections located at opposite sides of the two stitched portions 36 are sections located at the right side and the left side of the two stitched portions 36 in FIG. 5.

In the adjacent section 38, that is, the section extending along the ridges 35, if the projections 34 are arranged in a complex layout, for example, on portions corresponding to each side of a hexagonal lattice-shaped imaginary lines, the layout density of the projections 34 in the adjacent section 38 would vary.

In the interior component 10 of the present embodiment, the projections 34 are arranged next to one another along the ridges 35 in each of the three adjacent sections 38. Hence, when the projections 34 are arranged so that variations in the layout density of the projections 34 in a direction extending along the ridges 35 are reduced as compared to when the projections 34 are arranged in a complex layout. This reduces variations in the tactile sensation on each position in the adjacent section 38 of the cover member 30 and provides a good tactile sensation.

In addition, in the adjacent section 38, the projections 34 are arranged next to one another on the triangle-wave-shaped imaginary line VL1 extending on the opposing surface 33 of the main body 32. This increases the layout range of the projections 34 as compared to a configuration in which projections are arranged on an imaginary line extending straight along the ridges 35 on the opposing surface 33 of the cover member 30. This allows for the setting of a reaction force obtained when pushing the cover member 30 at a high degree of freedom.

When the projections 34 are arranged as described above, a good tactile sensation is obtained from each position of the adjacent section 38 of the cover member 30.

Figure 7:
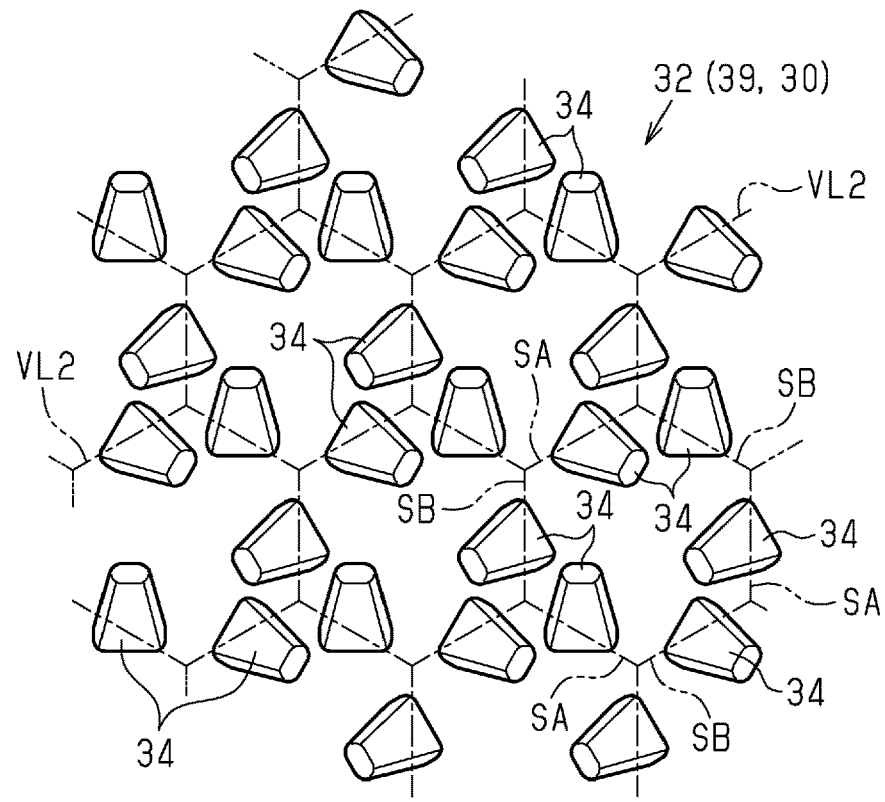
FIG. 7 is a side view showing a layout of projections on a general section of an opposing surface of a cover member.

As shown in FIGS. 5 and 7, in most sections (general sections 39), excluding the stitched portions 36 and the adjacent sections 38, when hexagonal-lattice-shaped imaginary lines VL2 extend on the opposing surface 33 of the main body 32, the projections 34 are arranged at positions corresponding to each side of the hexagonal lattice. In the present embodiment, the general section 39 corresponds to a section adjacent to the adjacent section 38.

In the general section 39, the projections 34 corresponding to three sides SA (FIG. 7) alternately arranged in a perimeter direction of each hexagon in the hexagonal lattice project in different directions from the projections 34 corresponding to the other three sides SB. More specifically, the projections 34 arranged at positions corresponding to the sides SA project in a state slightly inclined toward an inner side of the hexagon with respect to the perpendicular direction of the opposing surface 33 and also slightly inclined in a clockwise direction in the perimeter direction of the hexagon. The projections 34 arranged at positions corresponding to the sides SB project in a state slightly inclined toward an outer side of the hexagon with respect to the perpendicular direction of the opposing surface 33 and also slightly inclined in a counterclockwise direction in the perimeter direction of the hexagon. The projections 34 are arranged in the general section 39 so that when pushing of the ornamental surface 31 of the cover member 30 with a hand or finger elastically deforms the projections 34, the projections 34 will not come into contact with adjacent ones of the projections 34.

As described above, in the general section 39, the projections 34 are arranged in a complex manner so that the projections 34 are arranged at positions corresponding to each side of hexagons in the hexagonal lattice. In this configuration, a reaction force obtained when pushing the cover member 30 is balanced in each position of the general section 39 of the cover member 30. A good tactile sensation is obtained from each position of the general section 39 of the cover member 30.

Operation of the interior component 10 will be described below.

If the ridges 35 are not arranged, when a section of the ornamental surface 31 of the cover member 30 corresponding to the stitched portions 36 is pushed by a hand or finger, the reaction force received from the cover member 30 remains small until the main body 32 of the cover member 30 comes into contact with the base member 20. When a section of the ornamental surface 31 of the cover member 30 corresponding to the sections on which the projections 34 are arranged (the adjacent section 38 and the general section 39) is pushed by a hand or finger, the projections 34 projecting from the main body 32 come into contact the base member 20 and elastically deform. In this case, the reaction force received by the finger or hand from the cover member 30 is increased at a relatively early point in time. In the interior component 10, the difference in the point in time at which the reaction force received by a finger or hand is increased when pushing the cover member 30 appears as variations in a tactile sensation according to each section of the cover member 30.

In the interior component 10 of the present embodiment, although the projections 34 are not arranged on the stitched portions 36 of the cover member 30, the ridges 35 are arranged on the stitched portions 36 and extend along the stitchings 11. When a section of the ornamental surface 31 of the cover member 30 corresponding to the stitched portions 36 is pushed, the ridges 35 come into contact with the base member 20. Thus, the reaction force received from the cover member 30 is increased at an early point in time as compared to when an interior component does not include the ridges 35. This reduces the difference in the point in time at which the reaction force is increased between a section of the ornamental surface 31 of the cover member 30 corresponding to the stitched portions 36, that is, the stitch arranged section, and the other section. The other section refers to sections corresponding to the adjacent section 38 and the general section 39. Variations in a tactile sensation between the stitch arranged section and the other section of the cover member 30 are reduced.

In the interior component 10, the projection amount of the ridges 35 from the opposing surface 33 of the main body 32 is set to be equal to the projection amount of the projections 34 obtained when the ornamental surface 31 of the cover member 30 is pushed and the elastic deformation amount of the projections 34 is maximal in the assumed range. With this configuration, when the cover member 30 is pushed, the stitch arranged section and the other section of the ornamental surface 31 of the cover member 30 have the same maximum elastic deformation amount in the thickness-wise direction of the cover member 30, that is, the vertical direction in FIG. 1. When the stitch arranged section of the cover member 30 is pushed, the stitch arranged section will not elastically deform further after saturation of elastic deformation of a section surrounding the stitch arranged section (section excluding the stitch arranged section). Also, when the stitch arranged section of the cover member 30 is pushed, elastic deformation of the stitch arranged section will not be saturated before saturation of elastic deformation of the portion surrounding the stitch arranged section. This also reduces variations in a tactile sensation between the stitch arranged section and the other section of the cover member 30.

Figure 8:
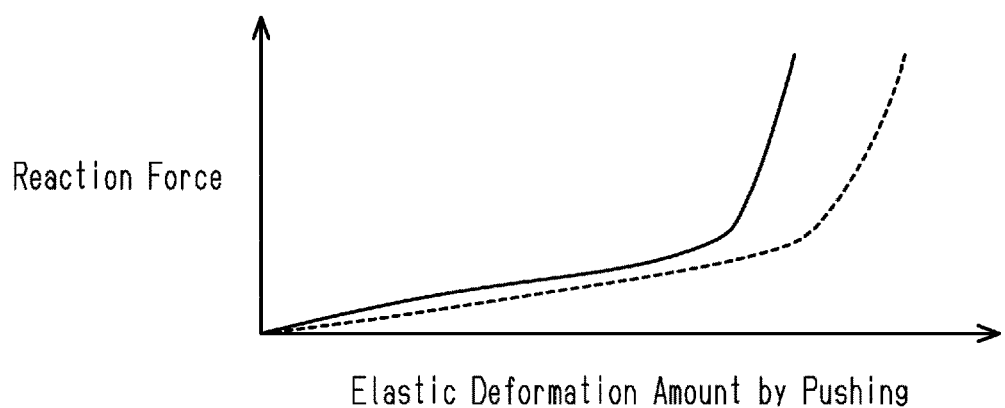
FIG. 8 is a graph showing the relationship between an elastic deformation amount of the cover member and a reaction force received from the cover member in a thickness-wise direction.

The inventor conducted tests to measure relationships between an elastic deformation amount of the cover member 30 in the thickness-wise direction when the ornamental surface 31 of the cover member 30 was pushed and a reaction force received from the cover member 30. The test results are shown in FIG. 8. The solid line in FIG. 8 shows a relationship when the stitch arranged section of the cover member 30 of the interior component 10 is pushed and a relationship when a portion of the cover member 30 excluding the stitch arranged section is pushed. These relationships are substantially the same and thus are indicated by the common line in FIG. 8. The broken line in FIG. 8 shows a relationship when the stitch arranged section of the cover member is pushed in a comparative example of an interior component that does not include the ridges 35.

As clearly shown in FIG. 8, in the interior component of the comparative example, a reaction force (broken line) received from the cover member when the stitch arranged section is pushed is less than a reaction force (see solid line) received from the cover member when a section excluding the stitch arranged section is pushed. In the interior component 10 of the present embodiment, a reaction force (solid line) received from the cover member 30 when the stitch arranged section is pushed is substantially equal to a reaction force received from the cover member 30 when a section excluding the stitch arranged section is pushed. As described above, the results of tests conducted by the inventor show that the interior component 10 of the present embodiment reduces variations in a tactile sensation between the stitch arranged section and the other section of the cover member 30.

The sewing apparatus used to form the stitchings 11 on the cover member 30 will be described below.

Figure 9A:
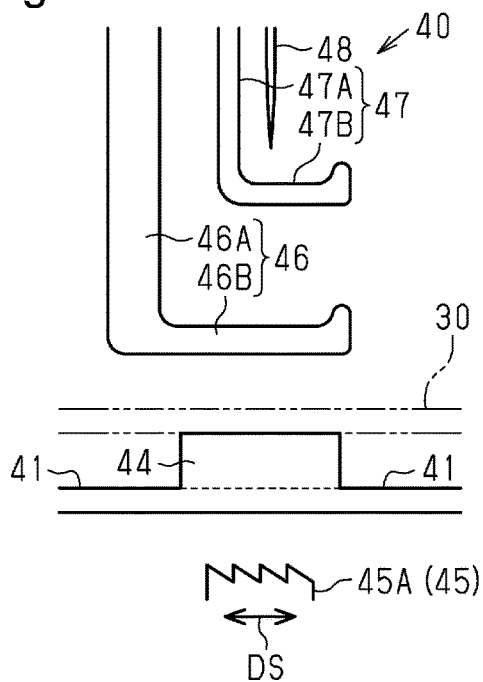
FIG. 9A is an exploded side view showing sewing parts of a sewing apparatus.
Figure 9B:
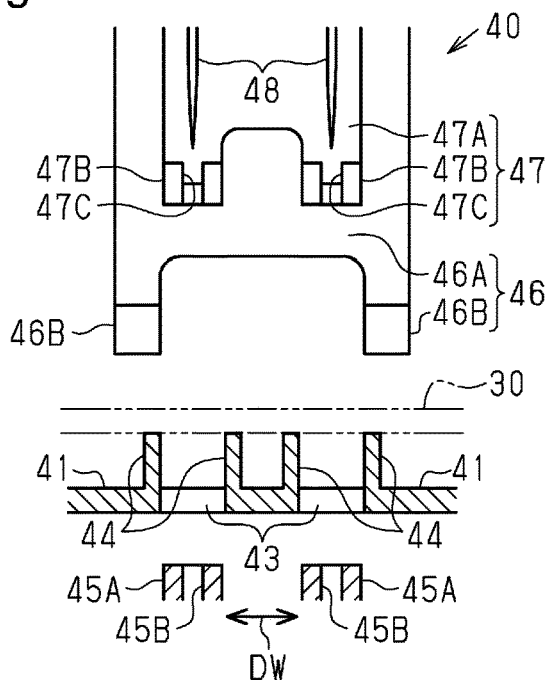
FIG. 9B is an exploded front view showing the sewing parts of the sewing apparatus.
Figure 10:
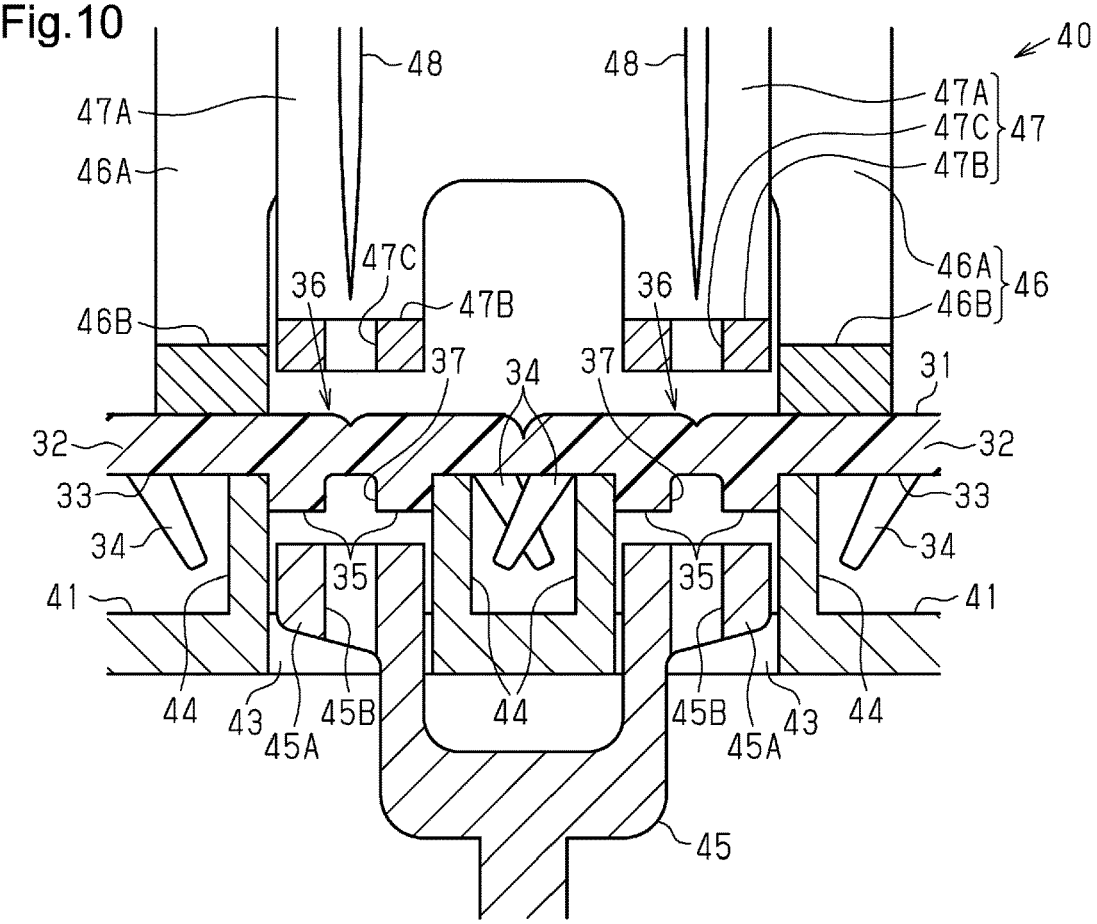
FIG. 10 is a cross-sectional front view showing the sewing parts of the sewing apparatus.

As shown in FIGS. 9A, 9B, and 10, the sewing apparatus 40 includes needle plates 41 having two needle holes 43. Each needle hole 43 is rectangular and extends so that long sides extend in a feeding direction DS in which the cover member 30 as a sewing subject is fed, that is, a sideward direction in FIG. 9A. The needle holes 43 extend parallel to each other arranged beside each other in a widthwise direction DW that is orthogonal to the feeding direction DS, that is, a sideward direction in FIG. 9B.

The needle plates 41 include four flat rising plates 44 projecting upward, that is, the upper side in FIG. 9A, from edges of the needle holes 43, more specifically, portions of the needle holes 43 corresponding to the long sides of the rectangle. Each needle plate 41 includes two rising plates 44 for each needle hole 43. The rising plates 44 extend parallel to each other in the feeding direction DS along the edges of the needle holes 43. Each rising plate 44 has a projection amount from the needle plate 41 that is greater than the projection amount of the projection 34 that is not elastically deformed from the main body 32 of the cover member 30.

The sewing apparatus 40 includes feeding teeth 45 used to feed the cover member 30 forward in the feeding direction DS (hereafter, simply referred to as "forward"). The feeding teeth 45 are arranged below the needle plates 41, that is, at a lower side in FIG. 9A. The feeding teeth 45 are configured to move upward to press the cover member 30 from below and move forward, that is, leftward in FIG. 9A, to feed the cover member 30 forward.

The feeding teeth 45 have a structure having an upper portion branched into two parts in the widthwise direction DW, that is, a sideward direction in FIG. 10. The feeding teeth 45 are movable in the vertical direction and the feeding direction DS when the two upper branched parts, namely, branches 45A, are inserted into the two needle holes 43 in the needle plates 41. Each branch 45A includes a slit 45B that extends in the feeding direction DS and is open rearward in the feeding direction DS (hereafter, simply referred to as "rearward"). The slits 45B avoid interference of a bottom thread when the feeding teeth 45 move in the feeding direction DS.

The sewing apparatus 40 includes a presser foot 46 used to press the cover member 30 from above when forming the stitchings 11. The presser foot 46 moves downward to press the cover member 30 from above so that the cover member 30 is sandwiched between a lower surface of the presser foot 46 and distal ends of the rising plates 44.

The presser foot 46 is L-shaped by an arm 46A extending in the vertical direction and a presser 46B extending rearward from a lower end of the arm 46A. The presser 46B has a structure having a rear portion branched into two parts in the widthwise direction DW. The presser 46B is movable in the vertical direction. The presser 46B includes a lower surface configured to come into contact with distal ends of outer ones of the four rising plates 44 when the presser 46B is moved downward.

The sewing apparatus 40 includes a feeding foot 47 used to feed the cover member 30 forward. The feeding foot 47 is configured to move downward to press the cover member 30 from above and move forward, that is, leftward in FIG. 9A, to feed the cover member 30 forward.

The feeding foot 47 is L-shaped by an arm 47A extending in the vertical direction and portions extending rearward from a lower end of the arm 47A, namely, two branches 47B. The feeding foot 47 has a structure having a lower portion branched into two parts in the widthwise direction DW, that is, the sideward direction in FIG. 10. The feeding foot 47 is movable in the vertical direction and the feeding direction DS when the two lower branched parts (branches 47B) are located above the two needle holes 43 in the needle plates 41. Each branch 47B includes a slit 47C that extends in the feeding direction DS and is open rearward. The slits 47C avoid interference of sewing needles 48 and a top thread when the feeding teeth 45 move in the feeding direction DS.

Steps of manufacturing the interior component 10 that include a step of forming the stitchings 11 on the cover member 30 using the sewing apparatus 40 will be described below.

(Step 1) The base member 20 and the cover member 30 are separately formed by molding.

(Step 2) The cover member 30 is set in the sewing apparatus 40.

More specifically, the cover member 30 is mounted on the needle plates 41, more specifically, the rising plates 44. At this time, as shown in FIG. 10, the two ridges 35 on the main body 32 of the cover member 30 are fitted to gaps between the distal ends of the rising plates 44 of the needle plates 41 of the sewing apparatus 40. Then, the presser foot 46 is lowered. As a result, the cover member 30 is held between the presser foot 46 and the distal ends of the rising plates 44 and is pressed by the presser foot 46. That is, the state shown in FIG. 10 is obtained.

(Step 3) The sewing apparatus 40 performs a sewing process to form the stitchings 11.

The sewing apparatus 40 sews the stitched portions 36 while feeding the cover member 30 forward to form the stitchings 11. In the present embodiment, the stitchings 11 are formed on the stitched portions 36 of the cover member 30 through a straight sewing.

In the present embodiment, when the sewing apparatus 40 forms the stitchings 11, the two rising plates 44 of the needle plates 41 engage with the ridge 35 of the cover member 30 so that the cover member 30 is guided in the feeding direction DS. Thus, the cover member 30 is guided so that the sewing apparatus 40 sews a proper portion, more specifically, the bottom of the groove 37 in the stitched portion 36.

In addition, the ridge 35, which is held between the two rising plates 44, hinders entrance of the projections 34 into the stitched portion 36, on which the ridge 35 is formed. The stitching 11 is formed on the stitched portion 36 without interference of the projections 34. Thus, the sewing apparatus 40 appropriately forms the stitchings 11 on the cover member 30 including the projections 34.

In the present embodiment, the projections 34 arranged on the adjacent sections 38 of the opposing surface 33 of the cover member 30 project in a manner inclined rearward in the feeding direction DS. When the sewing apparatus 40 feeds the cover member 30 forward to form the stitchings 11, this configuration limits entrance of the distal ends of the projections 34 into the gap between the two rising plates 44 as compared to a configuration in which the projections 34 arranged on the adjacent section 38 project in a manner inclined forward. Thus, the stitchings 11 are further appropriately formed on the cover member 30 including the projections 34.

In addition, in the present embodiment, the projection amount of a portion of the ridge 35 of the cover member 30 on which the stitching 11 is formed, more specifically, the projection amount of the bottom of the groove 37, is less than the projection amount of portions of the ridge 35 located at opposite sides of the portion on which the stitching 11 is formed. Thus, although the stitched portion 36 of the cover member 30 includes the ridge 35, the thickness of the portion of the cover member 30 on which the stitching 11 is formed is reduced. This reduces resistance applied to the sewing needles 48 when the stitching 11 is formed on the main body 32 of the cover member 30 through the sewing process, thereby facilitating formation of the stitching 11.

(Step 4) The cover member 30 on which the stitchings 11 are formed is fixed to the base member 20.

As described above, the present embodiment obtains the following advantages.

(1) The ridges 35 extending along the stitchings 11 are arranged on the stitched portions 36 of the cover member 30. This reduces variations in a tactile sensation between the stitch arranged section and the other section of the cover member 30.

(2) The projection amount of the ridge 35 from the opposing surface 33 of the main body 32 is set to be substantially equal to the projection amount of the projections 34 in the bottom touching state, in which the ornamental surface 31 of the cover member 30 is pushed by a hand or finger so that the projection 34 reaches the maximum elastic deformation amount in the assumed range. This appropriately reduces variations in a tactile sensation between the stitch arranged section and the other section of the cover member 30.

(3) In the adjacent sections 38 located adjacent to the stitched portions 36, the projections 34 are arranged next to one another on the imaginary line VL1, which extends on the opposing surface 33 of the main body 32 along the ridges 35. Hence, when the projections 34 are arranged so that variations in the layout density of the projections 34 in a direction extending along the ridges 35 are reduced as compared to when the projections 34 are arranged in a complex layout.

(4) In the section (adjacent section 38) located between the two lines of the stitched portions 36, that is, the section where a polygonal lattice layout of the projections 34 is a problem, the projections 34 may be arranged while reducing variations in the layout density in a direction extending along the ridge 35.

(5) In the adjacent section 38, the projections 34 are arranged on the opposing surface 33 of the main body 32 next to one another on the triangle-wave-shaped imaginary line VL1. This increases the layout range of the projections 34 as compared to a configuration in which projections are arranged on an imaginary line extending straight on the opposing surface 33 of the cover member 30. This allows for the setting of a reaction force obtained when pushing the cover member 30 at a high degree of freedom.

(6) In the ridge 35 of the cover member 30, the projection amount of a portion on which the stitching 11 is formed is set to be less than the projection amount of portions located at opposite sides of the portion on which the stitching 11 is formed. In this configuration, although the ridges 35 are arranged on the stitched portions 36 of the cover member 30, resistance applied to the sewing needles 48 is reduced when the stitchings 11 are formed on the main body 32 of the cover member 30 through the sewing process. This facilitates formation of the stitchings 11.

(7) When the two ridges 35 of the main body 32 of the cover member 30 are fitted to the gaps between the distal ends of the rising plates 44 of the needle plates 41 of the sewing apparatus 40, the sewing apparatus 40 sews the stitched portions 36 while feeding the cover member 30 forward to form the stitchings 11. Thus, the stitchings 11 are appropriately formed on the cover member 30 including the projections 34.

(8) The projections 34 arranged on the adjacent sections 38 of the opposing surface 33 of the cover member 30 project in a manner inclined rearward in the feeding direction DS. Thus, the stitchings 11 are further appropriately formed on the cover member 30 including the projections 34.

The above embodiment may be modified as follows.

The projection amount of the rising plates 44 from the needle plates 41 may be equal to or slightly less than the projection amount of a projection in a non-deformed state from the opposing surface 33 of the cover member 30.

The layouts of the projections 34 on the adjacent section 38 and the general section 39 of the opposing surface 33 of the cover member 30 may be changed in any manner. For example, in the general section 39 of the opposing surface 33 of the cover member 30, the projections 34 may be arranged on portions corresponding to each side of a triangle in a triangular lattice or may be arranged on portions corresponding to each side of a tetragon in a tetragonal lattice. In the general section 39 of the opposing surface 33 of the cover member 30, the projections 34 may be arranged on an imaginary line extending straight along the ridge 35 on the opposing surface 33. In another example, the projections 34 may be arranged in the same manner in the adjacent section 38 and the general section 39 of the opposing surface 33 of the cover member 30.

The interior component 10 and the method for manufacturing the interior component 10 of the embodiment may be applied to an interior component in which a single line of stitching 11 is formed on the main body 32 of the cover member 30 and an interior component in which three or more lines of stitchings 11 are formed.

The groove 37 may be omitted from the ridge 35 so that the projection amount of a portion of the ridge 35 on which the stitching 11 is formed is equal to the projection amount of portions of the ridge 35 located at opposite sides of the portion on which the stitching 11 is formed.

The projection amount of the ridge 35 from the opposing surface 33 of the main body 32 may be set to differ from the projection amount of the projections 34 in the bottom touching state in the thickness-wise direction.

Figure 11:
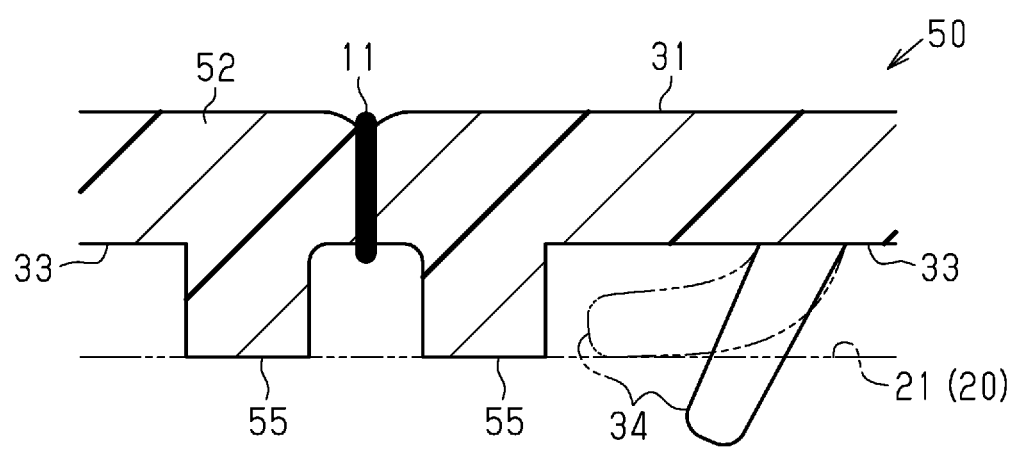
FIG. 11 is a cross-sectional view of ridges and their surroundings in a modified example of an interior component.

For example, as shown in FIG. 11, the projection amount of a ridge 55 from the opposing surface 33 of a main body 52 is greater than the projection amount of the projection 34 in the bottom touching state, that is, the state indicated by the double-dashed lines in FIG. 1. In such a configuration, when a range of the ornamental surface 31 of a cover member 50 including the portion where the ridge 55 is arranged is pushed, before the projection 34 reaches the maximum elastic deformation amount in the assumed range, the opposing surface 21 of the base member 20 comes into contact with the ridge 55. That is, the state indicated by the double-dashed line shown in FIG. 11 is obtained. As a result, further elastic deformation of the projections 34 is restricted. In the configuration described above, the maximum elastic deformation amount of the projection 34 in the thickness-wise direction when the range of the ornamental surface 31 of the cover member 50 including the portion where the ridge 55 is arranged is pushed may be adjusted by setting the projection amount of the ridge 55. This allows for the setting of a tactile sensation of the cover member 50 at a high degree of freedom.

The layered composite component and the method for manufacturing the layered composite component of the embodiment may be applied to vehicle interior components such as a luggage side trim and an instrument panel besides a door trim.

The invention claimed is:

1. A layered composite component, comprising:
    a plate-shaped base member formed from a plastic material;
    a cover member layered on the base member, the cover member including a plate-shaped main body and projections, the main body extending along the base member such that the main body is spaced apart by a gap from the base member, the projections projecting from an opposing surface of the main body opposed to the base member, the cover member being formed from a plastic material and being elastically deformable; and
    a stitching formed by a sewing thread on the main body, wherein
    the cover member includes a stitched portion linearly extending and including a portion of the opposing surface on which the stitching is formed,
    the projections are not formed on the stitched portion,
    the stitched portion includes a ridge extending along the stitching,
    the ridge projects toward the base member,
    the ridge is configured to come directly into contact with the base member as the gap between the base member and the main body is reduced, and
    the ridge is one of two ridges and the two ridges are arranged one on each side of the stitching.

2. The layered composite component according to claim 1, wherein
    the layered composite component has a cushioning property provided by a reaction force in accordance with an elastic deformation of the projections when the gap between the base member and the main body is reduced, so that the projections bend and elastically deform to contact the base member, and
    a projection amount of the ridge is equal to a projection amount of the projections when an amount of the elastic deformation is maximal.

3. The layered composite component according to claim 1, wherein
    a first set of the projections located in a section adjacent to the ridge are arranged next to one another on an imaginary line when the imaginary line extends along the ridge on the opposing surface, and
    a second set of the projections located in a section adjacent to the first set of the projections arranged on the imaginary line are arranged at positions corresponding to each side of a polygonal lattice when an imaginary line of the polygonal lattice extends on the opposing surface.

4. The layered composite component according to claim 3, wherein the imaginary line extending along the ridge is a triangle-wave-shaped line.

5. The layered composite component according to claim 1, wherein
    the stitching and the stitched portion are spaced apart from a further stitching and a further stitched portion arranged on the main body, and
    when an imaginary line extends along the ridge on the opposing surface, the projections located in a section between the stitched portions are arranged next to one another on the imaginary line.

6. The layered composite component according to claim 1, wherein a projection amount of a portion of the ridge on which the stitching is formed is less than a projection amount of portions of the ridge located at opposite sides of the portion of the ridge on which the stitching is formed.

7. The layered composite component according to claim 1, wherein the ridge has a rectangular cross section.

8. A method for manufacturing a layered composite component, wherein the layered composite component includes a plate-shaped base member formed from a plastic material, a cover member layered with the base member, and a stitching, the cover member includes a plate-shaped main body and projections, the main body extends along the base member such that the main body is spaced apart by a gap from the base member, the projections project from an opposing surface of the main body opposed to the base member, and the cover member is formed from a plastic material and is elastically deformable, the stitching is formed by a sewing thread on the main body, the cover member includes a stitched portion linearly extending and including a portion of the opposing surface on which the stitching is formed, the projections are not formed on the stitched portion, and the stitched portion includes a ridge extending along the stitching, the method comprising:

as a sewing apparatus configured to form the stitching, using a sewing apparatus including two rising plates extending from an edge of a thread plate defining a thread hole so that the two rising plates extend parallel in a direction in which a sewing subject is fed; and when the ridge is fitted to a gap between distal ends of the two rising plates, forming the stitching with the sewing apparatus sewing the stitched portion while feeding the cover member in one direction, wherein the ridge projects toward the base member, the ridge is configured to come directly into contact with the base member as a gap between the base member and the main body is reduced, and the ridge is one of two ridges and the two ridges are arranged one on each side of the stitching.

9. The method according to claim 8, wherein in the cover member, a first set of the projections located in a section adjacent to the ridge project in a manner inclined rearward in a direction in which the cover member is fed.

\* \* \* \* \*